United States Patent
McGarry

(10) Patent No.: US 9,652,692 B1
(45) Date of Patent: May 16, 2017

(54) MACHINE VISION SYSTEM FOR CAPTURING A DIGITAL IMAGE OF A SPARSELY ILLUMINATED SCENE

(71) Applicant: Cognex Corporation, Natick, MA (US)

(72) Inventor: John McGarry, San Diego, CA (US)

(73) Assignee: Cognex Corporation, Natick, MA (US)

( * ) Notice: Subject to any disclaimer, the term of this patent is extended or adjusted under 35 U.S.C. 154(b) by 0 days.

(21) Appl. No.: 15/420,622

(22) Filed: Jan. 31, 2017

Related U.S. Application Data

(60) Provisional application No. 62/399,936, filed on Sep. 26, 2016.

(51) Int. Cl.
| | |
|---|---|
| *G06K 9/00* | (2006.01) |
| *G06K 9/62* | (2006.01) |
| *G06K 9/38* | (2006.01) |
| *G06K 9/40* | (2006.01) |
| *G06T 5/20* | (2006.01) |

(52) U.S. Cl.
CPC ............ *G06K 9/6249* (2013.01); *G06K 9/38* (2013.01); *G06K 9/40* (2013.01); *G06K 9/6202* (2013.01); *G06T 5/20* (2013.01)

(58) Field of Classification Search
None
See application file for complete search history.

(56) References Cited

U.S. PATENT DOCUMENTS

| | | |
|---|---|---|
| 8,199,244 B2 | 6/2012 | Baraniuk |
| 9,453,730 B2 | 9/2016 | McGarry |
| 2012/0038786 A1 | 2/2012 | Kelly et al. |
| 2012/0162457 A1 | 6/2012 | Veeraraghavan |
| 2014/0231620 A1 | 8/2014 | Oike et al. |

(Continued)

FOREIGN PATENT DOCUMENTS

| | | |
|---|---|---|
| JP | 05-322539 | 12/1993 |
| WO | WO2012058229 | 5/2012 |

OTHER PUBLICATIONS

Baraniuk et al., "Exponential decay of reconstruction error from binary measurements of sparse signals", arXiv:1407.8246v1 [cs.IT] Aug. 1, 2014, pp. 1-27.

(Continued)

*Primary Examiner* — Soo Park
(74) *Attorney, Agent, or Firm* — Fish & Richardson P.C.

(57) ABSTRACT

A method includes producing two or more measurements by an image sensor having a pixel array, the measurements including information contained in a set of sign-bits, the producing of each measurement including (i) forming an image signal on the pixel array; and (ii) comparing accumulated pixel currents output from pixels of the pixel array in accordance with the image signal and a set of pixel sampling patterns to produce the set of sign-bits of the measurement; buffering at least one of the measurements to form a buffered measurement; comparing information of the buffered measurement to information of the measurements to produce a differential measurement; and combining the differential measurement with information of the set of pixel sampling patterns to produce at least a portion of one or more digital images relating to one or more of the image signals formed on the pixel array.

15 Claims, 6 Drawing Sheets

(56) References Cited

U.S. PATENT DOCUMENTS

2014/0285625 A1* 9/2014 McGarry ............ G01C 11/025
                                                        348/46
2016/0010990 A1   1/2016 McGarry

OTHER PUBLICATIONS

Boufounos et al., "1-Bit Compressive Sensing", Information Sciences and Systems, CISS, 42nd Annual Conference on Mar. 19-21, 2008, pp. 16-21, IEEE.
Candes et al., "Near-Optimal Signal Recovery From Random Projections: Universal Encoding Strategies?", IEEE Transactions on Information Theory, vol. 52, No. 12, Dec. 2006.
Candes et al.,"An Introduction to Compressive Sampling", IEEE Signal Processing Magazine, Mar. 2008, pp. 21-30.
Dalsa Technology with Vision, "Application Note, Line Scan Imaging Basics", 03-32-00541-00, pp. 1-11.
David L. Donoho, "Compressed Sensing", IEEE Transactions on Information Theory, vol. 52, No. 4, Apr. 2006, pp. 1289-1306.
Dubois et al., "A 10000 fps CMOS Sensor With Massively Parallel Image Processing", IEEE Journal of Solid State Circuits, Institute of Electrical and Electronics Engineers, vol. 43, No. 3, pp. 706-717, Mar. 2008.
Extended European Search Report, European Patent Application No. 14160933.9, Jan. 22, 2015, 9 pages.
Jacques et al., "CMOS Compressed Imaging by Random Convolution", 4 pages.
Jacques et al., "Robust 1-Bit Compressive Sensing via Binary Stable Embeddings of Sparse Vectors", URL: http://arxiv.org/abs/1104.3160v2, pp. 1-40, Feb. 15, 2012.
Knudson et al., "One bit compressive sensing with norm estimation", arXiv:1404.6863v1 [stat.ML], Apr. 28, 2014, pp. 1-15.
Majidzadeh et al., "A (256x256) Pixel 76.7mW CMOS Imager/Compressor Based on Real-Time In-Pixel Compressive Sensing", IEEE 2010, pp. 2956-2959.
Oike et al., "CMOS Image Sensor With Per-Column ADC and Programmable Compressed Sensing", IEEE Journal of Solid-State Circuits, vol. 48, No. 1, Jan. 2013, pp. 318-328.
Japanese Patent Application No. 2014-055305, Notice of Reasons for Refusal, mailed Mar. 31, 2015, 9 pages.

* cited by examiner

MACHINE VISION SYSTEM FOR CAPTURING A DIGITAL IMAGE OF A SPARSELY ILLUMINATED SCENE

CROSS-REFERENCE TO RELATED APPLICATIONS

This application claims the benefit of priority under 35 U.S.C. §119(e)(1) of U.S. Provisional Application No. 62/399,936, filed on Sep. 26, 2016, which is incorporated by reference herein.

BACKGROUND

The present disclosure relates generally to machine vision, and more particularly to machine vision systems that operate by digitizing images that are substantially compressible, i.e. digital images that can be well represented, according to some method of encoding, by a set of numbers that is, at least, 50% smaller than the set of pixel values. For instance, a naturally sparse image, such as the image formed of a scene illuminated by a plane of light is substantially compressible, since the sparse image can be represented by a set of numbers encoding the magnitude and location of a relatively small number of pixels corresponding to points of illumination in the scene, while all other pixel values can be encoded in a single number, which may be zero.

A machine-vision method for capturing information from the surface of an object-of-interest involves a two dimensional (2D) imaging device including a digital camera focused on a plane of illumination provided by a light source arranged at a fixed position relative to the digital camera. By moving the object-of-interest (or the imaging device) in a direction substantially perpendicular to the plane-of-illumination, a three dimensional (3D) point-cloud representing the surface of an object-of-interest may be progressively collected for subsequent analysis. In this method, the speed of 3D point cloud collection is typically limited by the maximum rate at which the digital camera can capture digital images, which may be determined by the design of the digital camera's image sensor.

Conventional complementary metal-oxide semiconductor (CMOS) image sensor architecture has been adapted to provide ultra-high-speed image capture, but the size, the cost, the complexity and the supporting system requirements, generally render such devices impractical for integration in a commercially feasible machine-vision system.

SUMMARY

In one aspect, the disclosed technologies can be implemented as a method including producing two or more measurements by an image sensor having a pixel array, each of the two or more measurements including information contained in a set of sign-bits, the producing of each measurement of the two or more measurements including (i) forming an image signal on the pixel array; and (ii) comparing accumulated pixel currents output from at least some pixels of the pixel array in accordance with the image signal and at least a portion of a set of pixel sampling patterns to produce the set of sign-bits of the measurement; buffering at least one measurement of the two or more measurements to form a buffered measurement; comparing information of the buffered measurement to information of the two or more measurements to produce a differential measurement; and combining the differential measurement with information of the set of pixel sampling patterns to produce at least a portion of one or more digital images relating to one or more of the image signals formed on the pixel array.

Implementations can include one or more of the following features. In some implementations, each of the forming of the image signal on the pixel array can include receiving a reference signal on a subset of pixels of the pixel array included as part of the image signal, and the combining can include combining information of the reference signal with the differential measurement and the information of the set of pixel sampling patterns to produce the at least a portion of one or more digital images.

In some implementations, the two or more measurements can include a first measurement and a second measurement. Here, the first measurement corresponds to an image signal including a reference signal, and the second measurement corresponds to another image signal including the reference signal and a signal-of-interest, the signal-of-interest formed when the pixel array acquires an image-of-interest received at the pixel array. Additionally, the buffering can include buffering of the first measurement.

In some cases, the buffering the at least one measurement can include averaging two or more of the two or more measurements produced based on the reference signal to form the buffered measurement.

In some cases, the combining can include forming the at least a portion of one or more digital images using operations related to multiplication of (i) a differential measurement matrix formed from a set of sign-bits associated with the differential measurement with (ii) a sampling matrix formed from the set of pixel sampling patterns. Further, the image-of-interest can be a sparse image, and the sampling matrix is factorable as a product of a sparse random matrix and a band matrix. For example, the combining can include performing sparse matrix multiplication of the differential measurement matrix with a transpose of at least a portion of the sparse random matrix to produce the at least a portion of a digital image. As another example, the combining can include performing sparse matrix multiplication of the differential measurement matrix with a transpose of at least a portion of the sparse random matrix; and convolving a result of the sparse matrix multiplication with coefficients of a convolution kernel derived from the band matrix to produce the at least a portion of one or more digital images comprising at least a portion of a digital image representative of the image-of-interest.

In another aspect, the disclosed technologies can be implemented as a vision system including an image sensor that includes a pixel array, a sampling pattern generator coupled with the pixel array, and readout circuitry coupled with the pixel array; and a digital processor coupled with the readout circuitry of the image sensor. The pixel array is controllable to form a reference signal and an image signal, the image signal formed as a composite of the reference signal and a signal-of-interest, the signal-of-interest formed when the pixel array acquires an image-of-interest. The readout circuitry is configured to produce a measurement matrix comprising information contained in a set of sign-bits produced by comparing accumulated pixel currents output from the pixel array in accordance with a set of pixel sampling patterns generated by the sampling pattern generator. Additionally, the digital processor is configured to receive, from the readout circuitry of the image sensor, a first measurement matrix produced based on the reference signal; receive, from the readout circuitry of the image sensor, a second measurement matrix produced based on the image signal; compare information of the first measurement matrix to information of the second measurement matrix to form a differential measurement matrix; and combine the differential measurement matrix with information of the set of pixel sampling patterns to produce at least a portion of a digital image relating to the signal-of-interest.

Implementations can include one or more of the following features. In some implementations, the image sensor can include a reference signal generator to provide a synthetic portion of the reference signal. Here, the pixel array includes a subset of pixels coupled with the reference signal generator, each of the pixels of the subset to receive the synthetic portion of the reference signal and output a dark pixel current proportional to a reference level of the synthetic portion of the reference signal. Additionally, the digital processor is configured to combine information of the reference level with the differential measurement matrix and the information of the set of pixel sampling patterns to produce the at least a portion of a digital image.

In some implementations, the digital processor is configured to produce the at least a portion of a digital image using operations related to multiplication of the differential measurement matrix with a sampling matrix formed from the set of pixel sampling patterns. For instance, the image-of-interest can be a sparse image, and the sampling matrix is constructed from a product of a sparse random matrix and a band matrix.

Further the digital processor is configured to perform sparse matrix multiplication of the differential measurement matrix with a transpose of at least a portion of the sparse random matrix to produce the at least a portion of one or more digital images comprising at least a portion of a digital image representative of the image-of-interest effectively filtered by a bandwidth limiting effect of the band matrix. Furthermore, the digital processor is configured to convolve a result of the sparse matrix multiplication with coefficients of a convolution kernel derived from the band matrix to produce the at least a portion of a digital image representative of the image-of-interest.

In some implementations, the readout circuitry can include readout circuits arranged by columns of the pixel array.

Details of one or more implementations of the disclosed technologies are set forth in the accompanying drawings and the description below. Other features, aspects, descriptions and potential advantages will become apparent from the description, the drawings and the claims.

BRIEF DESCRIPTION OF THE DRAWINGS

Like reference numbers and designations in the various drawings indicate like elements.

DETAILED DESCRIPTION

In the present disclosure, uppercase symbols are, generally, used to represent matrix quantities. Row numbers of a matrix are identified by the subscript i, column numbers by the subscript j. Lowercase symbols are, generally, used to represent vectors, which may be rows or columns of a matrix. For example, $x_i$ refers to a row vector of X, $x_j$ refers to a column vector of X, and $x_{ij}$ refers to an element of the row vector $x_i$. Parentheses are used to collectively reference all of the vectors or elements of a matrix, for example, $X=(x_i)=(x_j)$.

A colon, in conjunction with a subscript, is used to refer to a sub-matrix consisting of a subset of rows and/or columns of a matrix. For example, $(x_{i:i+m})$ refers to a sub-matrix of X, consisting of m rows of X beginning at row i.

Figure 1:
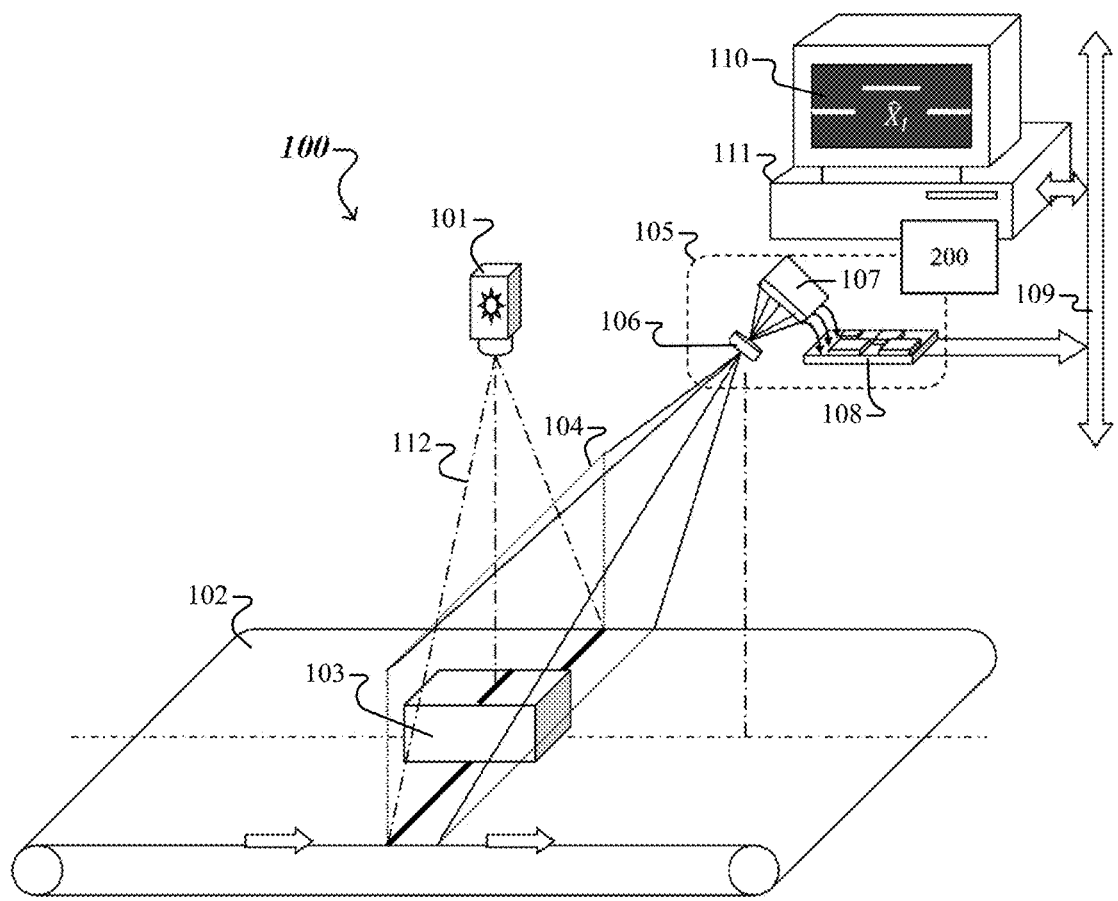
FIG. 1 shows an example of a vision system for capturing a 3D point cloud.

FIG. 1 is a diagram of a vision system 100 for implementing a method for capturing a 3D point cloud. The vision system 100 includes laser-beam generator 101, object conveyor 102, object 103, digital camera 105, digital communication channel 109, and digital processor 111. Digital camera 105 includes imaging lens 106, image sensor 107, and the camera's digital processor 108. Laser-beam generator 101 forms a plane-of-illumination 112, also referred to as the laser beam. Digital processor 111 includes a display depicting an exemplary digital image 110 that may be representative of an image (also referred to as an image-of-interest) received by digital camera 105.

As shown in FIG. 1, a plane-of-illumination 112 is configured to intersect object 103 as it moves through the scene on object conveyor 102. Digital camera 105 is positioned relative to laser beam generator 101 such that object plane 104 of lens 106 is substantially coincident with the plane-of-illumination 112.

In operation, imaging lens 106 collects light scattered by the scene and focuses it on image sensor 107, thus forming an optical image (also referred to as an image-of-interest) received by image sensor 107. Image sensor 107, which includes a rectangular array of photosensitive pixels, can be triggered to form over a period of time an electrical signal that is an analog of the optical image received by image sensor 107. This analog signal formed on image sensor 107, referred to as the image signal, is sampled and converted into digital image information, referred to as a measurement. The camera's digital processor 108 receives the measurement from image sensor 107 and formats the measurement for communication to digital processor 111 over digital communication channel 109. In some implementations, the camera's digital processor 108 also processes the measurement to form an alternative digital representation thereof.

The measurement formed by digital camera 105 is processed, either by local digital processor 108 or digital computer 111, to extract information related to points of illumination formed by the intersection of plane-of-illumination 112 with the surface of objects of interest in the scene. Pixel coordinates, corresponding to points of maximum illumination received by individual columns of a rectangular pixel array of image sensor 107, can be transformed into world coordinates in object plane 104, according to a predetermined camera calibration.

In some applications, object 103 is moved through plane-of-illumination 112 and points are extracted at regular intervals to form a 3D point-cloud including information of the surface of object 103. To provide for uniform sampling of the surface of object 103, the movement interval may be selected so as to be consistent with the horizontal resolution of the digital image.

When image sensor 107 of digital camera 105 is a conventional image sensor, the measurement formed by image sensor 107 is, typically, a digital image that may be conceptualized as a matrix $\hat{X}_1$ of discrete digital values, depicted at 110, wherein the position and magnitude of each element of the matrix is in direct correspondence with the position and magnitude of the image signal formed on the rectangular array of pixels included on the image sensor. In this case the time it takes to form a digital image will be, primarily, a function of the size of the digital image, relative to the speed and number of digitizers.

Most conventional image sensors operate by sampling voltage signals generated by pixels of a pixel array, and quantizing values of the voltage signals into hundreds, or even thousands, of levels to form a digital image. The process of digital readout includes switching the voltage signal of a pixel on to a conductor connected to a sampling device of the image sensor, waiting for the voltage signal to develop and stabilize, sampling the voltage signal, comparing the sampled voltage signal in multiple discrete steps to a reference signal(s) to arrive at a digital image value. Known methods of improving the image capture rate involve restricting the number of rows (or columns) to the minimum number required to accommodate the expected laser-beam displacement by objects in the scene, but in practice useful displacement images still require hundreds of rows of pixel readout. Other methods of improving the image capture rate involve the use of multiple digitizers. In practice however, the number of digitizers is restricted by the conductors necessary to access the individual pixel voltages. In a conventional CMOS image sensor, conductors are non-transparent, typically positioned in the optical path near photosensitive areas, and can only be stacked in a finite number of layers. The forgoing may limit the practical number of digitizers to be less than or equal to the number of columns or rows of the pixel array. Much is known about high-speed methods for digitizing image signals, but, ultimately, there are certain practical limits to the speed that can be achieved using conventional methods of digital image acquisition.

In the machine-vision system 100, we observed that the digital image formed by image sensor 107 of digital camera 105 may be relatively sparse and have structure that is well represented by a piecewise smooth function. In other words, the useful information content of the digital image may be exceedingly small relative to the dimension of the image signal, implying that a conventional image sensor will spend significant time digitizing useless and/or redundant signal information. In some application of machine-vision system 100 the useful information of the sparse image formed on image sensor 107 may be contained in the magnitude and location of one pixel value per column. In general, substantial improvement in the throughput of the vision system is possible if redundant readout and conversion of the image signal can be avoided.

In accordance with theories from the field of compressed-sensing, the vector angle of a K-sparse signal $x \in \mathbb{R}^N$ can be recovered, within some tolerance E, from M 1-bit measurement coefficients formed from the signs of random projections. For example, a measurement $y \in \{1, -1\}^M$, can be formed by taking the sign of x multiplied by a sampling matrix $A \in \{1, -1\}^{M \times N}$, where each element of A is independently determined by drawing values from a Bernoulli distribution, $$y = \text{sign}(Ax). \quad (1)$$

Compressive sensing provides a theoretical guarantee that, given a sufficient number of samples formed of random projections, in accordance with EQ. (1), the Hamming distance between any two measurements vectors $y_1$ and $y_2$ is approximately equal to the normalized angle between the corresponding signal vectors $x_1$ and $x_2$, $x_1 \neq x_2$ (within some tolerance $\epsilon$). It has been shown that the number of measurement bits required to ensure this pseudo-isometry is of order $\epsilon^{-2} K \ln(N)$, in other words, directly related to the product of the sparseness K and the log of the signal dimension N.

The forgoing result has great significance with respect to machine-vision system 100, where the image received by image sensor 107 is formed so as to be sparse and, therefore, substantially compressible and the system throughput may be constrained by conventional methods of digital image encoding and transfer.

In the vision-system 100, each column vector $x_j$ of the image signal X formed on the pixel array of image sensor 107 may be thought of as a K-sparse signal, where K<<N. In some embodiments, the image sensor 107 may have 512 rows and the sparse image formed of the scene can be reliably encoded in 256 bits per column. This represents a bit-rate compression of about 16:1 and, potentially, a 16$x$ improvement in throughput, relative to conventional methods of image sensor pixel-array sampling, which would, typically, include forming and transferring ~8-bits for each row of the 512 rows; in other words, 4096 bits per column of the image.

Despite the potentially underdetermined nature of the signal reconstruction problem, accurate signal recovery is nonetheless possible because the legitimate answers are constrained by the known sparseness of the image signal; the best approximation $x_i$ being maximally sparse, in the following manner:

$$x_i = \text{argmin}_{x_j} \|x_j\|_0 \text{ such that } \|\text{sign}(Ax_j) - y_j\|_1 < \delta \text{ and } \|x_j\|_2 = 1. \quad (2)$$

In practice, an exhaustive search of signal space can be avoided by using the transpose of the sampling matrix A to back-project measurement vectors $(y_j)$ into signal space, thereby arriving at an image signal approximation $\hat{X}$ that can be regularized according to magnitude, sparsity, structure and other known constraints:

$$\hat{X}_{t=0} = \text{regularize}(A^T Y). \quad (3)$$

Better signal approximations can be formed by steps of 1) projecting the current signal approximation $\hat{X}_t$ into measurement space, 2) forming an error vector in measurement space, 3) back-projecting the error vector into signal space, 4) subtracting the error-vector from the current signal approximation $\hat{X}_t$, and 5) regularizing to form $\hat{X}_{t+1}$:

$$\hat{X}_{t+1} = \text{regularize}(\hat{X}_t - A^T \text{sign}(\text{sign}(A\hat{X}_t) - Y)). \quad (4)$$

Better approximations can be pursued until the magnitude of the error vector declines to a level where further approximations are unwarranted. In practice, the number of iterations required to converge on a solution depends on the error tolerance and the effectiveness of the signal regularization method, which is related, primarily, to the sparseness of the signal. For a given error tolerance, sparser signals generally require fewer iterations to reach convergence.

However, since the solution of equation (4), by whatever means, provides only vector angle information of the original signal, it is generally impossible to make magnitude comparisons between signals recovered from measurements separated by space and/or time.

As an example relevant to a process for determining digital information of an image described in U.S. Pat. No. 9,453,730, consider a discrete 2-dimensional image signal represented by a matrix $X \in \mathbb{R}^{N \times N_2}$, encoded by random projection based on sampling matrix A in a binary measurement matrix $Y \in \{-1,1\}^{M \times N_2}$, according to:

$$Y = \text{sign}(AX). \quad (5)$$

Equation (5), which may be representative of the operations performed by a column-parallel image digitization apparatus described in U.S. Pat. No. 9,453,730, encodes, in Y, the relative magnitude within the column vectors of the 2-dimensional image signal X, but it may fail to encode the relative magnitude within the row vectors of X, implying that full recovery of the 2-dimensional image signal X is generally impossible by these means.

Notwithstanding the forgoing limitation, the encoding and recovery of signal magnitude from measurement bits can be realized based on process 200 for determining digital information of an image described below in connection with FIGS. 2A-2B, by adding to a signal-of-interest $X_I$ a reference signal $X_B$, which is a known signal. In practice, the reference signal vector $X_B$ can be formed from the composition of a generated reference signal vector $X_R$ and a noise signal vector $X_N$, $X_B = X_R + X_N$, by using image sensors like the one described below in connection with FIG. 3, for instance. As such, a measurement vector Y of an image signal vector $X = X_I + X_B$ can be produced from $$Y = \text{sign}(A(X_I + X_B)) \text{ where, } \forall j: \|x_{Bj}\|_2 > 0 \text{ and } x_{Bj} \perp x_{Ij}. \quad (6)$$

In equation (6), the signal-of-interest $X_I$ corresponds to an image (also referred to as an image-of-interest) received at the pixel array. For example, in accordance with the machine vision system 100, the image is said to be received at the pixel array as the lens 106 focuses the image at the pixel array. As discussed above, when the scene that includes the conveyor 202 and the object 203 is sparsely illuminated with a plane-of-illumination 112, the signal received by columns of the pixel array of image sensor 107 is typically sparse, i.e. K<<N.

The signal-of-interest $X_I$ is a latent component of the image signal X that is formed on the pixel array. A digital approximation of a column vector of the signal-of-interest $X_I$, denoted $\hat{x}_{Ij}$ can be produced from $$\hat{x}_{Ij} = \text{argmin}_{x_{Ij}} \|x_{Ij}\|_0 \text{ such that } \|\text{sign}(A(x_{Ij}+x_{Bj})) - y_j\|_1 < \delta. \quad (7)$$

Equation (7) implies an additional degree of freedom related to finding a coefficient that scales the maximally sparse signal approximation $\hat{x}_{Ij}$ relative to the reference signal $x_{Bj}$ in order to satisfy the sign consistency constraint. However, because the column vectors of reference signal are constructed from substantially equivalent coefficients, independent of the signal-of-interest, it is possible to efficiently approximate the scale factors required to recover signal magnitude.

A reference signal vector $x_{Bj}$ and the corresponding signal-of-interest $x_{Ij}$ may be thought of as representing the two legs of a right triangle, existing in N-dimensional signal space, with the image signal vector $x_j$ (from Equation 6) representing the hypotenuse. The vector angle between the reference signal $x_{Bj}$ and the image signal $\hat{x}_j$ can be approximated from the magnitude of the difference dY between their corresponding measurement vectors $$dY = \text{sign}(Y - \text{sign}(AX_B)). \quad (8)$$

Since the reference signal vector $x_{Bj}$ is known, the magnitude of the signal-of-interest $\|x_{Ij}\|_2$ can be approximated from $$\|x_{Ij}\|_2 = \|x_{Bj}\|_2 \left( \tan\left( \frac{\pi \|dy_j\|_1}{M} \right) \right), \text{ or} \quad (9)$$

$$\|x_{Ij}\|_2 \ni \|dy_j\|_1. \quad (9')$$

Given the signal magnitude, a signal-of-interest $\hat{x}_{Ij}$ can be recovered by finding the maximally sparse signal vector $x_{Ij}$ whose measurement space representation is sufficiently consistent with differential measurement $dy_j$ in the following manner:

$$\hat{x}_{Ij} = \text{argmin} \|x_{Ij}\|_0 \text{ such that } \|dy_j\|_1 - dy_j^T \text{sign}(Ax_{Ij}) < \delta, \text{ and} \quad (10)$$

$$\|x_{Ij}\|_2 = \|x_{Bj}\|_2 \left( \tan\left( \frac{\pi \|dy_j\|_1}{M} \right) \right).$$

In practice, it may be sufficient to approximate signal magnitude directly from the differential measurement, as implied in the following:

$$\hat{x}_{Ij} = \text{argmin} \|x_{Ij}\|_0 \text{ such that } \|dy_j\|_1 - dy_j^T \text{sign}(Ax_{Ij}) < \delta,$$
$$\text{and } \|x_{Ij}\|_2 = \|dy_j\|_1. \quad (11)$$

As before, an exhaustive search of signal space may be avoided, by using the transpose of the sampling matrix A to back-project the differential measurement dY into signal space and regularize according to sparsity. As such, signal approximations $\hat{X}_I$ can be produced according to equations (12) and (13):

$$\hat{X}_{I_{t=0}} = \text{regularize}(A^T dY), \text{ and} \quad (12)$$

$$\hat{X}_{I_{t+1}} = \text{regularize}(\hat{X}_{I_t} - A^T \text{sign}(\text{sign}(A\hat{X}_{I_t}) - dY)). \quad (13)$$

Figure 2A:
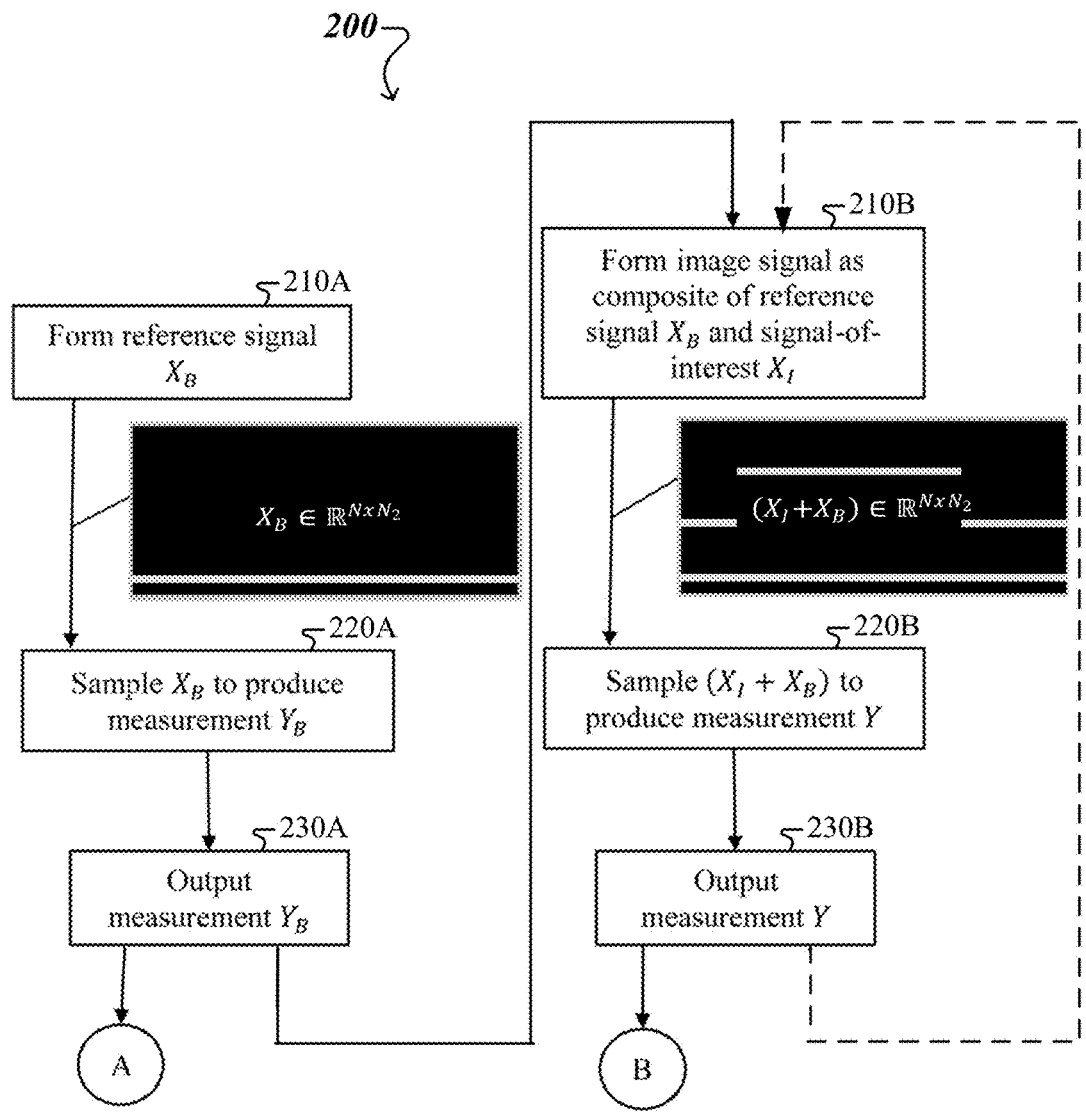
FIGS. 2A-2B show aspects of an example of a process for producing a differential measurement of a signal-of-interest formed on an image sensor, and for producing, based on the differential measurement, a digital image corresponding to the signal of interest.
Figure 2B:
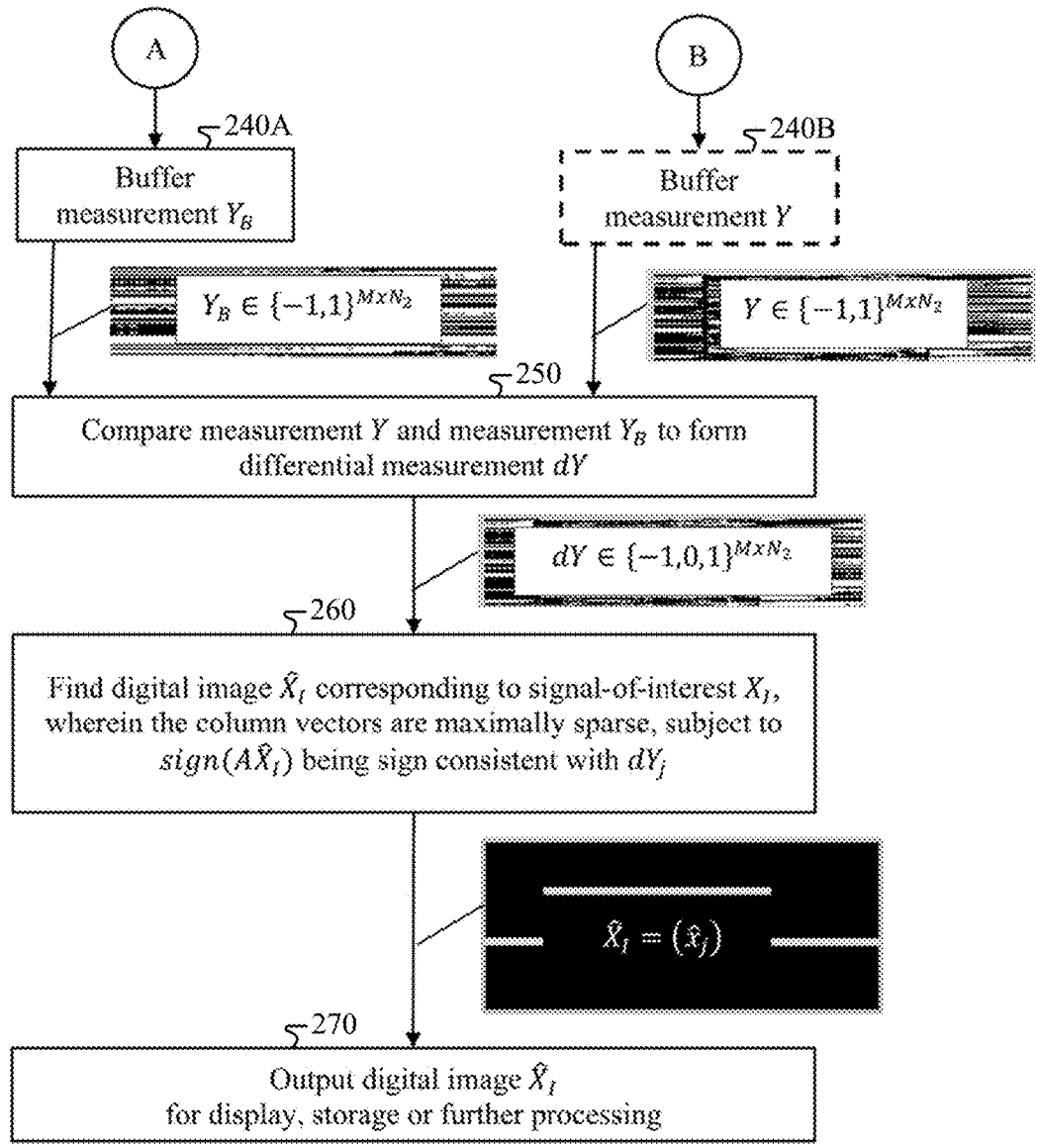

FIGS. 2A-2B show an example of a process 200 for producing a digital image in accordance with various aspects of the present disclosure. Operations of the process 200 can be performed by an image sensor (e.g., image sensor 307 described below in connection with FIG. 3) and a digital processor. Moreover, the image sensor that performs some of the operations of process 200 can be used in the digital camera 105, and the digital processor that performs other of the operations of process 200 can be the digital processor 108/111.

At 210A, a first image signal $X_B$ is formed on the pixel array. The first image signal is also referred to as a reference signal $X_B$. An example of a reference signal $X_B$ formed on a pixel array with N rows and $N_2$ columns is illustrated in an inset bubble of FIG. 2A.

In some implementations, the forming, at 210A, of the reference signal $X_B$ includes optically and/or electronically shuttering the pixel array, such that the pixel array is effectively prevented from capturing and/or sensing an image (also referred to as an image-of-interest) formed by lens 106 at the pixel array. An example of electronic shuttering of the pixel array by holding a reset signal is described in detail below in connection with FIG. 3 and FIG. 4B. As another example, electronic shuttering of the pixel array can be accomplished by setting exposure time to zero when forming the reference signal $X_B$. This method of shuttering the pixel array is potentially advantageous because it allows for the accumulation and subsequent cancellation of dark-current noise that, absent a reset signal, accumulates in a photosensitive pixel over a sampling time interval (in which sampling of the reference signal $X_B$ is performed, at 220A).

In other implementations, the forming, at 210A, of the reference signal $X_B$ includes optically and/or electronically shuttering the light source (e.g., the illumination plane 112,) such that the pixel array is effectively prevented from being exposed to optical energy originating from the light source. For instance, the laser-based light source 101 can be so bright, and the exposure so short, that all that is needed to do is, periodically, switch it off to form, on the pixel array, a first image signal that includes only the reference signal $X_B$, while $X_I=0$. The benefit of this shuttering method is that the forming of $X_B$ is identical to the forming of X (described below at 210B), except for the addition of light received as $X_I$.

In this manner, either of the foregoing implementations of shuttering ensures that $X_I=0$, i.e., no signal-of-interest is formed while the reference signal $X_B$ is formed, at 210A.

At 220A, the reference signal $X_B$ is sampled to produce a measurement $Y_B$. This can be performed by the image sensor in accordance with EQ. (5), in which $X=X_B$. As such, the measurement $Y_B$ contains information encoded in the state of sign-bits corresponding to the signs of measurement coefficients determined based on $AX_B$. For example, sign-bit "1" may represent the value "+1", and sign-bit "0" represent the value "−1". Further, the measurement $Y_B$ is formed, at 220A, on a row-by-row basis, using a sampling matrix A with M rows, where M<<N.

At 230A, the measurement $Y_B$ is output by the image sensor. For instance, the image sensor can transmit, at 230A, on a row-by-row basis, the measurement $Y_B$ for off-sensor buffering.

Referring now to FIG. 2B, at 240A, the measurement $Y_B$ is buffered in a reference measurement buffer associated with the digital processor. An example of a measurement $Y_B$ buffered as a matrix with M rows and $N_2$ columns is illustrated in an inset bubble of FIG. 2B. The buffered measurement $Y_B$ will be further processed by the digital processor as described below.

Returning now to FIG. 2A, at 210B, upon completion of the transmission of the measurement $Y_B$, a second image signal X is received by the pixel array. As the shuttering used at 210A is not used at 210B, the second image signal includes, in addition to the reference signal $X_B$, a latent signal-of-interest $X_I$ corresponding to an image (also referred to as an image-of-interest) received at the pixel array, such that $X=X_I+X_B$. Of particular interest to the disclosed technologies, the image received at the pixel array is a sparse image as described above in connection with EQs. (6)-(13). Moreover, the image signal $X_I+X_B$ is received by the pixel array as described in detail below in connection with FIG. 3 and FIGS. 4A-4B. An example of an image signal $X_I+X_B$ received by a pixel array with N rows and $N_2$ columns is illustrated in another inset bubble of FIG. 2A.

At 220B, the image signal $X_I+X_B$ is sampled to form a measurement Y. This can be performed by the image sensor in accordance with EQ. (5), in which $X=X_I+X_B$. As such, the measurement Y contains information encoded in the state of sign-bits corresponding to the signs of measurement coefficients determined based on $A(X_I+X_B)$. Once again, sign-bit "1" may represent the value "+1", and sign-bit "0" represent the value "−1". Further, the measurement Y is formed, at 220B, on a row-by-row basis, using the same sampling matrix A used at 220A.

At 230B, the measurement Y is output by the image sensor. For instance, the image sensor can transmit, at 230B, on a row-by-row basis, the measurement Y for further processing by the digital processor.

Referring now to FIG. 2B, at 240B, the measurement Y can be optionally buffered in a measurement buffer associated with the digital processor. An example of a measurement Y buffered as a matrix with M rows and $N_2$ columns is illustrated in another inset bubble of FIG. 2B.

At 250, the measurement Y is compared with the measurement $Y_B$ to form a differential measurement dY. For example, the digital processor can subtract the measurement $Y_B$ from the measurement Y to form the differential measurement dY. The differential measurement dY contains $M \times N_2$ coefficients, each coefficient having a value belonging to the set {4,0,1}, where the value "1" represents a subtraction result greater than zero, value "0" represents a subtraction result equal to zero, and the value "−1" represents a subtraction result less than zero. An example of a differential measurement dY is illustrated in yet another inset bubble of FIG. 2B.

At 260, a digital image $\hat{X}_I$ corresponding to the signal-of-interest $X_I$ is found. As the signal-of-interest $X_I$ corresponds to an image formed at the pixel array, the digital image $\hat{X}_I$ found at 260 is indicative of the image received at the pixel array. In some implementations, for every column j the digital processor finds a maximally sparse vector $\hat{x}_{Ij}$ corresponding to a measurement vector $sign(Ax_1)$ that is sign-consistent with a corresponding differential measurement vector $dy_j$ within some tolerance δ, e.g., in accordance with Equation (11). In some implementations, operation 260 can be performed in accordance with Equation (10). The vectors $(\hat{x}_j)$, found at 260, are the columns of the digital image $\hat{X}_I$ corresponding to the signal of interest $X_I$. An example of a digital image $\hat{X}_I$ is illustrated in yet another inset bubble of FIG. 2B.

At 270, the digital image $\hat{X}_I$ is output for display, storage or further processing. For example, the digital processor can output the digital image $\hat{X}_I$ to an output device. In some implementations, the output device can be a display device associated with the digital processor. In some implementations, the output device can be a storage device associated with the digital processor. The stored digital image $\hat{X}_I$ can be further processed to extract information of the image formed at the pixel array, for example information of the location and intensity of points of light caused by scattering of scattered laser light that is part of plane-of-illumination 112 from the surface of objects of interest 103, in accordance with the operation of the machine vision system 100 of FIG. 1.

Referring again to FIG. 2A, upon completion of the transmission of the measurement Y at 230B, another instance of the measurement Y can be optionally produced. As such, the sequence of operations 210B, 220B and 230B of process 200 can be performed to respectively (i) form a subsequent instance of the second image signal X, (ii) sample the subsequent instance of the second image signal X to produce a subsequent instance of the measurement Y, and (iii) output the subsequent instance of the measurement Y to the digital processor for further processing thereof in conjunction with the buffered measurement $Y_B$.

In some implementations, the sequence of operations 210B, 220B and 230B for producing the second measurement can be performed for a predetermined number of additional times, e.g., 1, 2, 5, 10, 20, 50, 100, 200, 500, 1000 or more times, for each time the sequence of operations 210A, 220A and 230A for producing the first measurement is performed. In other implementations, the sequence of operations 210A, 220A and 230A for producing the first measurement is performed only once when the image sensor is powered on. In some other implementations, the sequence of operations 210A, 220A and 230A for producing the first measurement can be performed after each time the sequence of operations 210B, 220B and 230B for producing the second measurement is performed. In each of the foregoing implementations, the set of operations 250, 260 and 270 is performed by the digital processor after each time the sequence of operations 210B, 220B and 230B for producing the second measurement.

Figure 3:
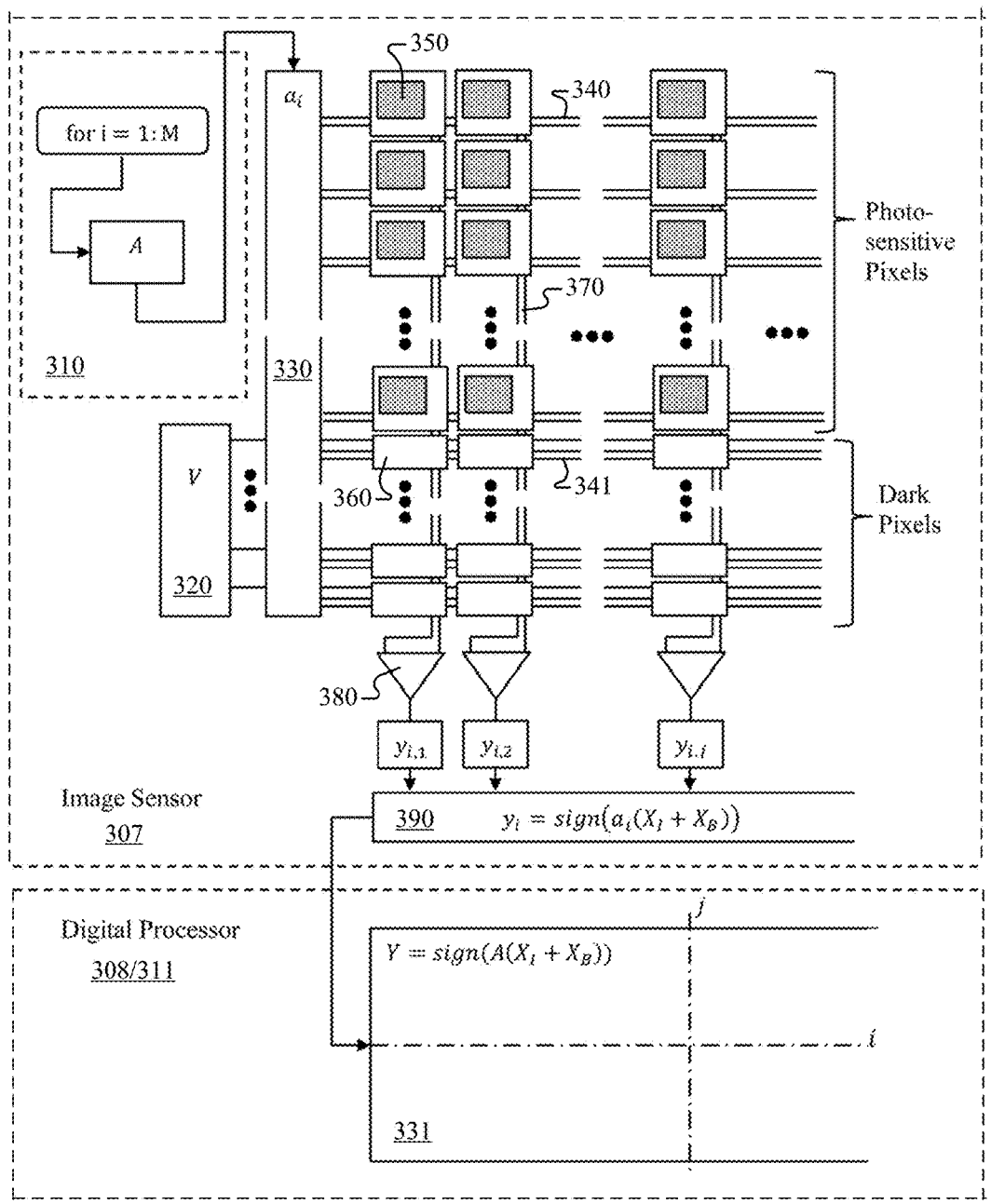
FIG. 3 shows an example of an image sensor to be used in the vision system of FIG. 1 for implementing the process of FIGS. 2A-2B.

FIG. 3 is a block diagram of an image-sensor 307 consistent with the image sensor 207 used in conjunction with process 200. The image sensor 307 includes a pixel array having rows of photo-sensitive pixels 350 and rows of dark pixels 360, such that columns of the pixel array include both photo-sensitive pixels 350 and dark pixels 360. The image sensor 307 further includes circuitry for generating a set of pixel sampling patterns including a sampling pattern generator 310 and a sampling matrix row register 330. In some implementations, the image sensor 307 includes a reference signal generator 320, also referred to as a reference voltage generator. Additionally, the image sensor 307 includes readout circuitry including pixel output select lines 340 coupled with the sampling pattern generator 310 and corresponding to rows of the pixel array that include photo-sensitive pixels 350 and rows of the pixel array that include dark pixels 360; reference voltage lines 341 coupled with the reference voltage generator 320 and corresponding to rows of the pixel array that include dark pixels 360; current output nodes 370 corresponding to columns of the pixel array that include photo-sensitive pixels 350 and dark pixels 360; comparators 380 coupled with corresponding current output nodes 370; and an output shift-register 390 coupled with the comparators 380.

FIG. 3 also depicts a partial representation of a digital processor 308/311 consistent with the digital processor 208/211 used in conjunction with process 200. For example, the digital processor 308/311 includes a measurement storage buffer 331.

In operation, the pixel array forms an image signal $X_I + X_B$ in the following manner. An image (also referred to as an image-of-interest) is focused on the pixel array such that the photosensitive pixels 350 form a corresponding signal-of-interest $X_I$, while reference voltage generator 320 provides, on reference voltage lines 341 to the dark pixels 360, a voltage signal representing at least a (synthetic) portion of the reference signal $X_B$. As such, in some implementations, the reference signal $X_B$ is provided as a reference voltage vector V having a number of coefficients equal to the number of rows of dark pixels 360.

In some applications, the reference voltage vector V is configured so that magnitudes of column vectors of $X_B$ are approximately equal to the magnitude a column vector corresponding to the full scale response of the image sensor 307 to the signal-of-interest $X_I$, thereby providing sensitivity to a wide range of image signal magnitudes.

In other applications where the signal-of-interest $X_I$ is very weak and/or recovery of signal magnitude is not essential, the image sensor 307 can be configured so that the dark pixels 360 that provide reference signal $X_R$ are omitted, deactivated or ignored, to effectively render $X_R=0$ in the formation of $X_B=X_R+X_N$ and making $X_B=X_N$, which may represent the image sensor 307's background noise level.

Subsequent to the formation of the image signal $X_I + X_B$, the sampling pattern generator 310 successively forms rows 1 through M of sampling matrix A on sampling matrix row register 330. Each of the rows of sampling matrix A represents a respective sampling pattern and, thus, the rows 1 through M of sampling matrix A form a set of sampling patterns. The contents of sampling matrix row register 330 drive pixel output select lines 340, thus setting a corresponding state of the pixel select lines. In turn, the state of the pixel output select lines 340 causes certain pixels 350 and 360 to supply respective pixel currents to current output nodes 370. For instance, for each column of the pixel array, the state of the pixel output select lines 340, determined by one of the set of pixel sampling patterns, causes selection of (i) pixel currents of a first set of pixels, that includes at least one of the photosensitive pixels 350 and at least one of the dark pixels 360, to the first current output node 370 to accumulate a first current, and (ii) pixel currents of a second set of pixels, that includes at least another one of the photosensitive pixels and at least another one of the dark pixels, to the second current output node to accumulate a second current. The resulting currents accumulated on all of the current output nodes 370 are compared by comparators 380 such that output shift-register 390 forms a row $y_i$ of a matrix of the measurement Y in accordance with the equation $y_i=\text{sign}(a_i(X_I+X_B))$. Note that a result of these comparisons determines the state of the sign-bits of row $y_i$ of the measurement. The matrix of the measurement Y is output, row by row, from the image sensor 307 and received by measurement storage buffer 331 of digital processor 308/311.

Figure 4A:
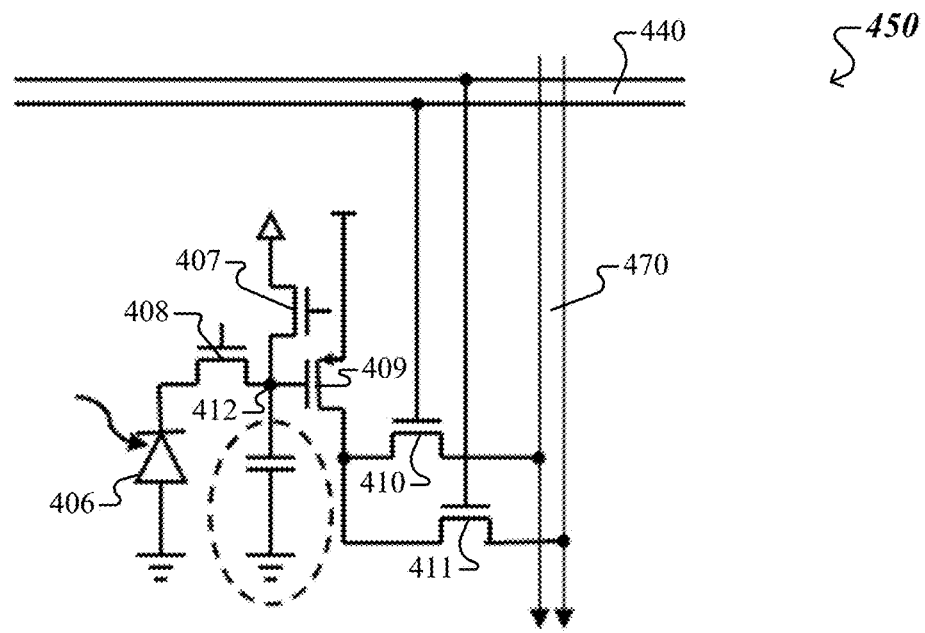
FIGS. 4A-4B show aspects of pixels included in the image sensor of FIG. 3.
Figure 4B:
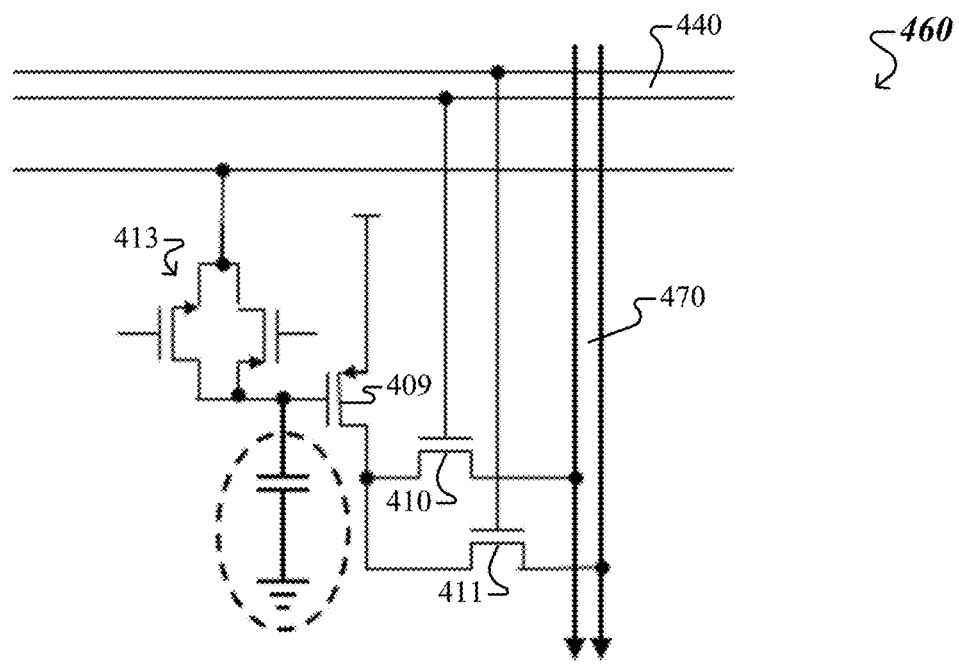

FIG. 4A is a circuit diagram showing aspects of a photosensitive pixel 450. The photosensitive pixel 450 is consistent with the photosensitive pixels 350 of the image sensor 307 described above in connection with FIG. 3. FIG. 4B is a circuit diagram showing aspects of a dark pixel 460. The dark pixel 460 is consistent with the dark pixels 360 of the image sensor 307 described above in connection with FIG. 3. In both FIGS. 4A-4B, pixel 450/460 is coupled with pixel output select lines 440 and current output nodes 470 that are respectively consistent with the pixel output select lines 340 and current output nodes 370 of the image sensor 307 described above in connection with FIG. 3. In some implementations, pixel output select lines 440 are shared by all the pixels 450/460 of a row of the pixel array. In other implementations, pixel output select lines 440 are shared by some of the pixels 450/460 of a row of the pixel array.

Referring now to FIG. 4A, the photosensitive pixel 450 includes pinned photodiode 406, reset transistor 407, transfer gate 408, transconductor 409, output select transistors 410, 411 and floating diffusion node 412. The pinned photodiode 406 can be reset through reset transistor 407 and allowed to accumulate photo-generated electric charge for an exposure period. The accumulated electric charge is transferred to floating diffusion node 412 through transfer gate 408 for temporary storage. A corresponding pixel voltage level stored at the floating diffusion node 412, corresponds to photosensitive pixel 450's contribution to the image signal $X=X_I+X_B$, and controls transconductor 409 to provide a current source that is proportional to the stored pixel voltage level. Moreover, the reset transistor 407 included in each of the photosensitive pixels 450 can be selectively activated using a reset voltage level. In such instances, charge related to the signal-of-interest $X_I$, accumulated in pinned photodiode 406, is blocked from migrating to the floating diffusion node 412, thus, effectively creating the condition where $X_I=0$ that corresponds to the image signal being $X=X_B$, and thereby providing for the formation of the measurement $Y_B$ used in the formation of the differential measurement dY. As such, the reset voltage level is stored at the respective floating diffusion nodes to control the respective transconductors of the photosensitive pixels of the pixel array to provide respective current sources proportional to the stored reset voltage level.

Referring now to FIG. 4B, the dark pixel 360 is coupled with reference voltage line 441 that is consistent with the reference voltage line 341 of the image sensor 307 described above in connection with FIG. 3. In accordance with the example of the image sensor 307 illustrated in FIG. 3, reference voltage line 441 can be shared by all the dark pixels 460 of a row. The dark pixel 460 includes transconductor 409, output select transistors 410, 411, and CMOS switch 413. A reference voltage level provided by reference voltage signal line 441 is buffered using the CMOS switch 413. In this manner, similar to the photosensitive pixel 450, the transconductor 409 of the dark pixel 460 provides a current source that is proportional to the buffered reference voltage level.

Referring now to both FIGS. 4A-4B, depending on the state of pixel output select lines 440, the pixel current from the transconductor 409 of a photosensitive pixel 450 or of a dark pixel 460 can be switched through transistors 410 or 411 to one of two current output nodes 470, which are shared by all the pixels 450 and 460 on a column. Note that the select transistors 410, 411 of each of the pixels 350, 360 are part of column-wise readout circuits of the image sensor 307 along with the pixel output select lines 440/340, the current output nodes 470/370 and other components described above in connection with FIG. 3.

In some implementations, the transconductor 409 included in either of the photosensitive pixel 450 or the dark pixel 460 may be implemented as a PMOS (positive-channel metal-oxide semiconductor) transistor, hence, making the pixel current contributed by transconductor 409 to the currents accumulated on the current output nodes 470 directly proportional to the voltage level stored on the floating diffusion node 412. Thus, when the image formed at the pixel array is sparse, as for example in the machine vision system 100 of FIG. 1, the pixel current necessary to represent information of the corresponding image signal X will be relatively small, because the unexposed pixels will demand little current beyond the small amount related to biasing of the transconductor transistor 409 for operation in the linear regime.

Figure 5:
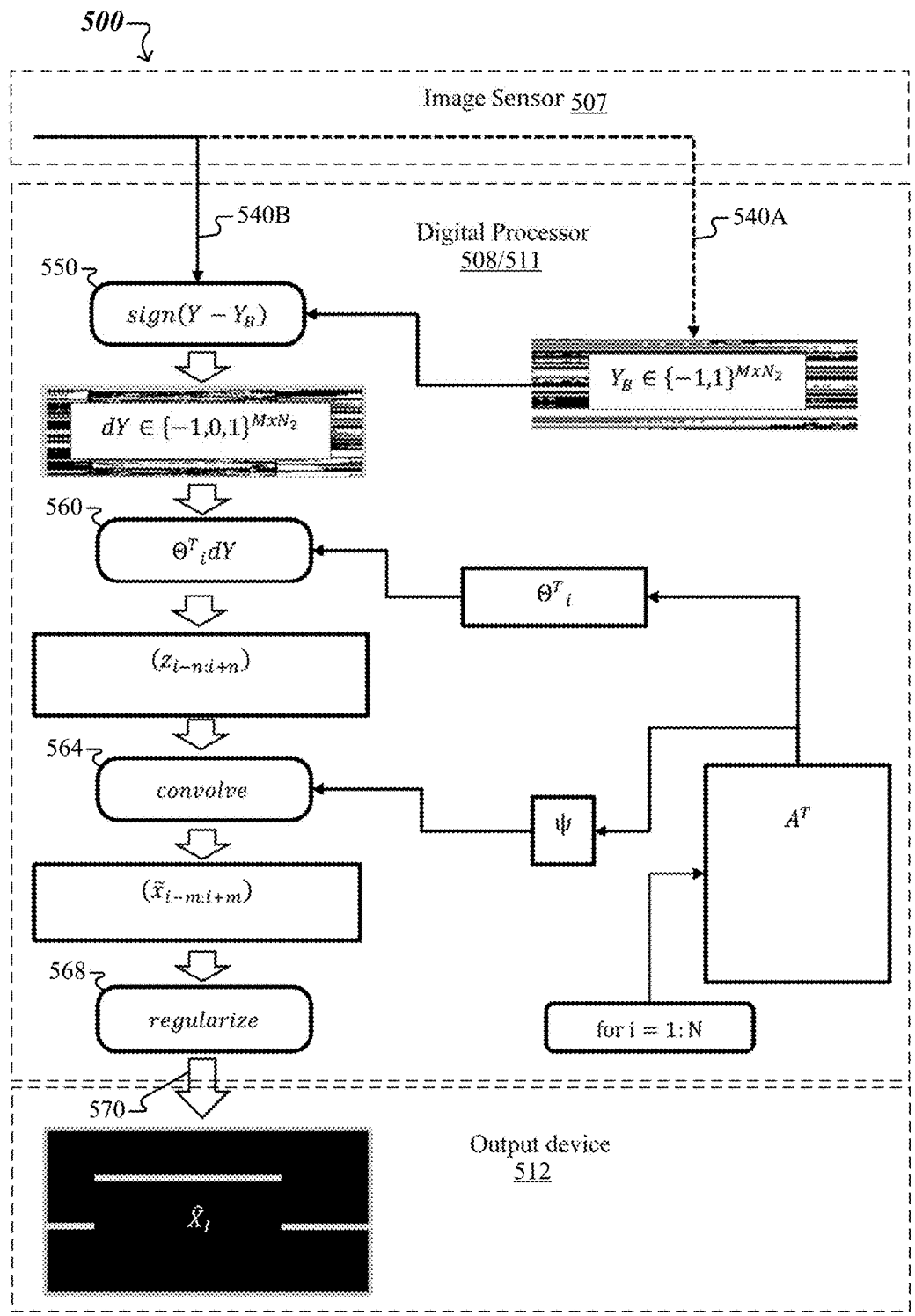
FIG. 5 shows an example of a process for producing, from a measurement of a composite image signal, a digital image corresponding to a signal-of-interest of the composite image signal.

FIG. 5 shows an example of a process 500 for producing, from a measurement of an image signal $X=X_I+X_B$, a digital image $\hat{X}_I$ corresponding to the latent signal-of-interest $X_I$.

Operations of the process 500 can be performed by a digital processor 508/511 similar to the digital processor used in conjunction with process 200. In this example, the digital processor 508/511 is in communication with an image sensor 507 and an output device 512 that are respectively consistent with the image sensor 207 and output device 212 used in conjunction with process 200.

At 540A (corresponding to 230A), the digital processor 508/511 receives from image sensor 507 a measurement $Y_B$ corresponding to image signal $X_B$. At 540B (corresponding to 230B), the digital processor 508/511 receives from image sensor 507 a measurement Y corresponding to image signal $X=X_I+X_B$. Note that the measurement Y and the measurement $Y_B$ are formed by the image sensor 507 at respective operations 220B and 220A of process 200. For instance, the measurement Y has been formed while the photosensitive pixels of the image sensor store pixel voltage levels related to the image signal $X=X_I+X_B$, and the measurement $Y_B$ has been produced while the photosensitive pixels of the image sensor store pixel voltage levels substantially equal to their reset voltage level.

At 550, the digital processor 508/511 compares information of the measurement $Y_B$ to information of the measurement Y. For example, the digital processor 508/511 can subtract the measurement $Y_B$ from the measurement Y to form a differential measurement dY. A combination of (i) information derived from the differential measurement dY, (ii) information of the set of pixel sampling patterns ($a_i$), and (iii) information of the reference voltage level $X_R$ can be used to produce information representative of the signal-of-interest $X_I$.

In some implementations, as disclosed in U.S. Pat. No. 9,453,730 at c. 10, ll. 10-28 and ll. 41-64; c. 11, ll. 13-32; c. 12, ll. 24-32; c. 12, l. 61-c. 13, l. 54; c. 14, ll. 1-29, the sampling matrix $A \in \{-1,0,1\}^{M \times N}$ may be constructed from the product of a sparse random matrix $\Theta \in \{-1,0,1\}^{M \times N}$ and a band matrix $\Psi \in \{-1,0,1\}^{N \times N}$:

$$A = \Theta \Psi. \quad (14)$$

In some applications, $\Psi$ is used to bandwidth limit the signal so as to increase the sparseness of the signal encoded in the measurement Y. For example, the band matrix $\Psi$ can include coefficients for computing an approximate spatial derivative, multiplication by band matrix $\Psi$ being equivalent to convolution by a kernel including 2n coefficients given by $\psi$, for example:

$$\Psi = \begin{bmatrix} 1 & \cdots & 0 \\ \vdots & \ddots & \vdots \\ 0 & \cdots & 1 \end{bmatrix}^{N \times N} * \psi, \text{ where} \quad (15)$$

$$\psi = [-1, -1, -1, 1, 1, 1].$$

In the example shown in EQ. (15), n=4, so the convolution kernel $\psi$ has 8 coefficients.

At 560, the digital processor 508/511, having been configured with information of the sparse random matrix $\Theta$ and coefficients of the convolution kernel $\psi$, sequentially multiplies the rows of the transpose of $\Theta$ by columns of the differential measurement dY to sequentially form rows $(z_{i-n:i+n})$, where i=1 ... N. The rows $(z_{i-n:i+n})$ formed at 560 are buffered to form a portion of the first approximation of signal-of-interest signal $X_I$ convolved with $\psi$.

At 564, the digital processor 508/511 convolves the rows $(z_{i-n:i+n})$ by $\psi$ to produce a row $\tilde{x}_i$, the latter being a row vector of the differential measurement dY back-projected into signal space. Note that the back-projected differential measurement $\tilde{X}$ produced at 564 is mathematically equivalent to $A^T dY$, however, to improve computational efficiency, the digital processor 508/511 takes advantage of the fact that the sampling matrix A, although relatively dense, is the product of two substantially sparse factors $\Theta$ and $\Psi$. This factoring of the sampling matrix A allows the computationally intensive dense matrix multiplication implied by $A^T dY$ to be replaced by a more efficient method that includes sparse matrix multiplication by $\Theta$, followed by convolution with as described above. As such, the digital processor 508/511 can include a sparse matrix multiplier for multiplying the differential measurement dY by the transpose of the sparse random matrix $\Theta$ factored from the sampling matrix. The sparse matrix multiplier can be implemented in hardware, firmware, software or combinations thereof.

At 568, the digital processor 508/511 regularizes $\tilde{X}$ to produce values of a digital image $\hat{X}_I$ corresponding to the signal-of-interest $X_I$. In some embodiments, the regularization performed at 568 may include rank value filtering of column vectors of the un-regularized image $\tilde{X}$ to identify the coefficients, which may be zeroed, or otherwise adjusted, to produce structured sparseness in the produced digital image $\hat{X}_I$ that is substantially consistent with the known structure of the signal-of-interest $X_I$.

At 570, the digital processor 508/511 outputs the digital image $\hat{X}_I$ corresponding to the signal-of-interest $X_I$ to an output device 512 for storage, display or further analysis, as noted in connection with process 200.

The disclosed technologies have at least two primary benefits relative to the technologies disclosed in U.S. Pat. No. 9,453,730.

First, the column vectors $dy_j$ of a differential measurement dY, produced at 250 of process 200 or at 550 of process 500, represent measurements taken relative to a substantially equivalent reference signal vectors $x_{Bj}$. Therefore, pixels of the digital image $\hat{X}_I$ reconstructed from the differential measurement dY will have the correct relative magnitude relationship.

Second, when a reference measurement $Y_B$ is subtracted from a measurement Y to form the differential measurement dY, the remaining non-zero coefficients of the differential measurement dY are primarily the contribution of the signal-of-interest $X_I$, since, in the image sensor 307, the accumulated current differential produced by $a_i x_{Ij}$ must be opposite in direction and greater in magnitude than that of $a_i x_{Bj}$ to produce a non-zero result in the differential measurement coefficient $dy_{ij}$. Since the reference measurement $Y_B$ is formed from the projections of a reference signal $X_B$, which includes image sensor noise $X_N$ of the image sensor 307 and, in some cases, a generated reference signal $X_R$, it follows that the non-zero coefficients of the differential measurement dY represent information of the image signal that is substantially independent of the influence of the image sensor noise $X_N$.

Notwithstanding the forgoing, it is important to note that, for a fixed reference signal $X_B$, the ultimate Signal to Noise Ratio (SNR) of the reconstructed digital image $\hat{X}_I$ will be influenced by the number of non-zero coefficients in the differential measurement dY, because the effective number of measurement bits, is inversely proportional to the accuracy of the mapping between signal and measurement space, in accordance with the product of the sparseness K and the log of the signal dimension N.

What is claimed is:

1. A method comprising:
    producing two or more measurements by an image sensor having a pixel array, each of the two or more measurements comprising information contained in a set of sign-bits, the producing of each measurement of the two or more measurements comprising
        (i) forming an image signal on the pixel array; and
        (ii) comparing accumulated pixel currents output from at least some pixels of the pixel array in accordance with the image signal and at least a portion of a set of pixel sampling patterns to produce the set of sign-bits of the measurement;
    buffering at least one measurement of the two or more measurements to form a buffered measurement;
    comparing information of the buffered measurement to information of the two or more measurements to produce a differential measurement; and
    combining the differential measurement with information of the set of pixel sampling patterns to produce at least a portion of one or more digital images relating to one or more of the image signals formed on the pixel array.

2. The method of claim 1, wherein
    each of the forming of the image signal on the pixel array comprises receiving a reference signal on a subset of pixels of the pixel array included as part of the image signal, and
    the combining comprises combining information of the reference signal with the differential measurement and the information of the set of pixel sampling patterns to produce the at least a portion of one or more digital images.

3. The method of claim 1, wherein
    the two or more measurements comprise a first measurement and a second measurement, the first measurement corresponding to an image signal comprising a reference signal, and the second measurement corresponding to another image signal comprising the reference signal and a signal-of-interest, the signal-of-interest formed when the pixel array acquires an image-of-interest received at the pixel array, and
    the buffering comprises buffering of the first measurement.

4. The method of claim 3, wherein the buffering the at least one measurement comprises averaging two or more of the two or more measurements produced based on the reference signal to form the buffered measurement.

5. The method of claim 3, wherein
    the combining comprises forming the at least a portion of one or more digital images using operations related to multiplication of (i) a differential measurement matrix formed from a set of sign-bits associated with the differential measurement with (ii) a sampling matrix formed from the set of pixel sampling patterns.

6. The method of claim 5, wherein
    the image-of-interest is a sparse image, and
    the sampling matrix is factorable as a product of a sparse random matrix and a band matrix.

7. The method of claim 6, wherein the combining comprises:
    performing sparse matrix multiplication of the differential measurement matrix with a transpose of at least a portion of the sparse random matrix to produce the at least a portion of a digital image.

8. The method of claim 6, wherein the combining comprises:
    performing sparse matrix multiplication of the differential measurement matrix with a transpose of at least a portion of the sparse random matrix; and
    convolving a result of the sparse matrix multiplication with coefficients of a convolution kernel derived from the band matrix to produce the at least a portion of one or more digital images comprising at least a portion of a digital image representative of the image-of-interest.

9. A vision system comprising:
    an image sensor comprising a pixel array, a sampling pattern generator coupled with the pixel array, and readout circuitry coupled with the pixel array; and
    a digital processor coupled with the readout circuitry of the image sensor;
    wherein the pixel array is controllable to form a reference signal and an image signal, the image signal formed as a composite of the reference signal and a signal-of-interest, the signal-of-interest formed when the pixel array acquires an image-of-interest, wherein the readout circuitry is configured to produce a measurement matrix comprising information contained in a set of sign-bits produced by comparing accumulated pixel currents output from the pixel array in accordance with a set of pixel sampling patterns generated by the sampling pattern generator; and wherein the digital processor is configured to
- receive, from the readout circuitry of the image sensor, a first measurement matrix produced based on the reference signal,
- receive, from the readout circuitry of the image sensor, a second measurement matrix produced based on the image signal,
- compare information of the first measurement matrix to information of the second measurement matrix to form a differential measurement matrix, and
- combine the differential measurement matrix with information of the set of pixel sampling patterns to produce at least a portion of a digital image relating to the signal-of-interest.

10. The vision system of claim 9, wherein the image sensor further comprises:
- a reference signal generator to provide a synthetic portion of the reference signal;
- wherein the pixel array includes a subset of pixels coupled with the reference signal generator, each of the pixels of the subset to receive the synthetic portion of the reference signal and output a dark pixel current proportional to a reference level of the synthetic portion of the reference signal; and
- wherein the digital processor is configured to combine information of the reference level with the differential measurement matrix and the information of the set of pixel sampling patterns to produce the at least a portion of a digital image.

11. The vision system of claim 9, wherein the digital processor is configured to produce the at least a portion of a digital image using operations related to multiplication of the differential measurement matrix with a sampling matrix formed from the set of pixel sampling patterns.

12. The vision system of claim 11, wherein
the image-of-interest is a sparse image, and
the sampling matrix is constructed from a product of a sparse random matrix and a band matrix.

13. The vision system of claim 12, wherein the digital processor is configured to perform sparse matrix multiplication of the differential measurement matrix with a transpose of at least a portion of the sparse random matrix to produce the at least a portion of one or more digital images comprising at least a portion of a digital image representative of the image-of-interest effectively filtered by a bandwidth limiting effect of the band matrix.

14. The vision system of claim 13, wherein the digital processor is configured to convolve a result of the sparse matrix multiplication with coefficients of a convolution kernel derived from the band matrix to produce the at least a portion of a digital image representative of the image-of-interest.

15. The vision system of claim 9, wherein the readout circuitry comprises readout circuits arranged by columns of the pixel array.

* * * * *